US010572456B2

(12) United States Patent
Staeben et al.

(10) Patent No.: US 10,572,456 B2
(45) Date of Patent: Feb. 25, 2020

(54) METHOD, APPARATUS, AND COMPUTER PROGRAM PRODUCT FOR DATA QUALITY ANALYSIS

(71) Applicant: HERE GLOBAL B.V., Eindhoven (NL)

(72) Inventors: Carla Staeben, Tewksbury, MA (US); Cristina Maier, Watertown, MA (US); Bob Savard, Haverhill, MA (US); Alex Wilbur, Reading, MA (US)

(73) Assignee: HERE GLOBAL B.V., Eindhoven (NL)

( * ) Notice: Subject to any disclaimer, the term of this patent is extended or adjusted under 35 U.S.C. 154(b) by 626 days.

(21) Appl. No.: 14/493,816

(22) Filed: Sep. 23, 2014

(65) Prior Publication Data

US 2015/0134591 A1 May 14, 2015

Related U.S. Application Data

(60) Provisional application No. 61/881,804, filed on Sep. 24, 2013.

(51) Int. Cl.
*G06F 16/21* (2019.01)
*G06F 16/215* (2019.01)
(Continued)

(52) U.S. Cl.
CPC ............ *G06F 16/21* (2019.01); *G06F 16/215* (2019.01); *G06F 16/951* (2019.01)

(58) Field of Classification Search
CPC .. G06F 9/5061; G06F 9/542; G06F 17/30563; G06F 17/30; G06F 17/30569;
(Continued)

(56) References Cited

U.S. PATENT DOCUMENTS 6,721,747 B2 * 4/2004 Lipkin ................ G06F 16/9535
709/209
9,092,468 B2 * 7/2015 Nelke .................... G06Q 10/10
(Continued)

OTHER PUBLICATIONS

International Searching Authority, International Search Report and Written Opinion for International Application No. PCT/EP2014/070287, dated Dec. 23, 2014, European Patent Office, 11 pages, The Netherlands.
(Continued)

*Primary Examiner* — Alford W Kindred
*Assistant Examiner* — Cecile H Vo
(74) *Attorney, Agent, or Firm* — Alston & Bird LLP

(57) ABSTRACT

A system is disclosed to evaluate data quality in a big data environment. An example method performed by the system includes retrieving one or more rules from an asset catalog. The method further includes retrieving, based on the one or more rules, counter information from a data set, and generating, by a processor, one or more metrics based on the one or more rules and the counter information. In addition, the method includes evaluating, by the processor, the one or more metrics based on the one or more rules. In an instance in which evaluation of a particular metric of the one or more metrics identifies an attribute value that exceeds a predetermined threshold, the method includes causing a notification message regarding the particular metric to be output. A corresponding apparatus and computer program product are also provided.

20 Claims, 7 Drawing Sheets

(51) Int. Cl.
*G06F 16/951* (2019.01)
*G06F 16/25* (2019.01)

(58) Field of Classification Search
CPC ......... G06F 17/30067; G06F 17/30528; G06F 17/30557; G06F 9/4443; G06F 17/30241; G06F 16/254; G06F 16/951; G06F 16/955; G06F 16/21; G06F 16/215
USPC .......... 709/224, 242; 719/318; 707/E17.044, 707/E17.001, E17.032, 602, 694, E17.01, 707/625, 802, E17.03, 687, 999.003, 705, 707/736, 782, 821, 999.104, 999.107, 707/E17.014, 741, 803; 715/219, 764, 715/854
See application file for complete search history.

(56) References Cited

U.S. PATENT DOCUMENTS

| | | | | |
|---|---|---|---|---|
| 9,465,825 | B2* | 10/2016 | Nelke | .................... G06Q 10/10 |
| 2003/0006931 | A1* | 1/2003 | Mages | .................... G01S 19/11 |
| | | | | 342/357.32 |
| 2012/0173724 | A1* | 7/2012 | Kache | ................... G06F 9/5061 |
| | | | | 709/224 |
| 2013/0006931 | A1* | 1/2013 | Nelke | ............... G06F 17/30303 |
| | | | | 707/625 |
| 2017/0017705 | A1* | 1/2017 | Nelke | .................... G06Q 10/10 |

OTHER PUBLICATIONS

Hamilton, *CataLogger: A Framework for Building Asset Management Solutions*, Proceedings. Twenty-Third Annual International Computer Software and Applications Conference (Cat. No. 99CB37032), (1999), pp. 328-329, Phoenix, Arizona, USA. DOI: 10.1109/CMPSAC.1999.812731.

Rahm et al., *Data Cleaning: Problems and Current Approaches*, Bulletin of the Technical Committee on Data Engineering, vol. 23, No. 4, Dec. 2000, pp. 1-11.

Auer et al., *Introduction to Linked Data and Its Lifecyle on the Web*, Reasoning Web. Reasoning on the Web in the Big Data Era: 10th International Summer School 2014, Sep. 8-13, 2014, pp. 1-90, Athens, Greece.

Reisser, *Utilizing Semantic Web Technologies for Efficient Data Lineage and Impact Analyses in Data Warehouse Environments*, pp. 59-63, (2009) 2009 20th International Workshop on Database and Expert Systems Application, Linz. DOI: 10.1109/DEXA.2009.74.

Gudipati, *Big Data: Testing Approach to Overcome Quality Challenges*, Infosys Labs Briefings, vol. 11, No. 1, (2013), pp. 65-72.

Loddengaard, *Advice on QA Testing Your MapReduce Jobs*, Cloudera, Jul. 29, 2009, pp. 1-4. [Retrievd From the Internet Sep. 17, 2019] <https://web.archive.org/web/20121127234636/http://blog.cloudera.com/blog/2009/07/advice-on-qa-testing-your-mapreduce-jobs/>.

* cited by examiner

Calculations:
low range test passed: true /— 508
high range test passed: false submitted value: 97358189
threshold: 0.12 historical average deviation low: 70219339 /— 510
historical average deviation high: 89370068
historical average number days: 14
historical average: 79794704

Incoming metric:

id: 425
assetUuid: http://<DAC URL>/schemata/noa/event-log#
serviceName: NoA
metricName: Number of Records successfully processed
created: 2013-09-12 00:14:44.0
timeOfCapture: 2013-09-12 00:14:44.0
classification: COMPLETENESS
subclassification: ROWCOUNT_SUCCESS
unitOfMeasure: RECORD_COUNT
processingStep: PLATFORM_ETL
value: 97358189 backAverage: 79794704

FIG. 5B

METHOD, APPARATUS, AND COMPUTER PROGRAM PRODUCT FOR DATA QUALITY ANALYSIS

CROSS-REFERENCE TO RELATED APPLICATIONS

This application claims the benefit of U.S. Provisional Application No. 61/881,804, filed Sep. 24, 2013, the entire contents of which are incorporated by reference herein.

TECHNOLOGICAL FIELD

Example embodiments of the present invention relate generally to analysis of big data sets and, more particularly, to a method and apparatus for analyzing the quality of data in a big data set.

BACKGROUND

"Big data" refers to a data set so large and complex that it is difficult to process using traditional data management tools or data processing applications. In this regard, traditional relational databases and/or other types of databases have become unable to manage such large (and often growing) data sets in a practical amount of time. Accordingly, distributed cluster computing has increasingly been employed to manage "big data" systems. In such systems, computation may be broken down into a map phase, in which input can be iteratively broken down into problems and distributed to various nodes of the cluster, and a reduce phase, in which the answers to the problems may be combined back together for output.

Heretofore, such distributed cluster computing systems have principally been focused on capturing data. Thus, one problem yet to be resolved with respect to these systems is that there may be quality concerns about the data stored therein. In this regard, there exists a need to analyze big data sets to determine what data should be stored. Moreover, it remains important to understand how the data links together, and accordingly what the data models should look like. Accordingly, it may be of importance to determine what standards should be followed. In other words, a principle problem concerning the management of big data sets comprises the traditional inability to analyze and evaluate the underlying quality of the data.

BRIEF SUMMARY

Accordingly, a method, apparatus, and computer program product are provided for evaluating data as part of a quality analysis of a big data set. In this regard, a method, apparatus, and computer program product are provided to process data, generate metrics, and analyze the quality of the metrics.

In a first example embodiment, a method is provided. The method includes retrieving one or more rules from an asset catalog and retrieving, based on the one or more rules, counter information from a data set. The method further includes generating one or more metrics based on the one or more rules and the counter information, and evaluating, by a processor, the one or more metrics based on the rules. Finally, the method includes, in an instance in which the evaluation of a particular metric exceeds a predetermined threshold, outputting a notification message regarding the particular metric.

In a second example embodiment, an apparatus is provided. The apparatus includes at least one processor and at least one memory including computer program code, wherein the at least one memory and the computer program code configured to, with the at least one processor, cause the apparatus to retrieve one or more rules from an asset catalog and retrieve, based on the one or more rules, counter information from a data set. The at least one memory and the computer program code are further configured to, with the at least one processor, cause the apparatus to generate one or more metrics based on the one or more rules and the counter information, and evaluate the one or more metrics based on the rules. Finally, in an instance in which the evaluation of a particular metric exceeds a predetermined threshold, the at least one memory and the computer program code configured to, with the at least one processor, cause the apparatus to output a notification message regarding the particular metric.

In a third example embodiment, a computer program product is provided. The computer program product includes at least one non-transitory computer-readable storage medium having computer-executable program code portions stored therein, wherein the computer-executable program code portions comprise program code instructions that, when executed, cause an apparatus to retrieve one or more rules from an asset catalog and retrieve, based on the one or more rules, counter information from a data set. The computer-executable program code portions further comprise program code instructions that, when executed, cause the apparatus to generate one or more metrics based on the one or more rules and the counter information, and evaluate the one or more metrics based on the rules. Finally, in an instance in which the evaluation of a particular metric exceeds a predetermined threshold, the computer-executable program code portions further comprise program code instructions that, when executed, cause the apparatus to output a notification message regarding the particular metric.

In a fourth example embodiment, an apparatus is provided. The apparatus includes means for retrieving one or more rules from an asset catalog and means for retrieving, based on the one or more rules, counter information from a data set. The apparatus further includes means for generating one or more metrics based on the one or more rules and the counter information, and means for evaluating the one or more metrics based on the rules. Finally, the apparatus includes, in an instance in which the evaluation of a particular metric exceeds a predetermined threshold, means for outputting a notification message regarding the particular metric.

In another example embodiment, a method is provided for evaluating data quality. The method includes retrieving one or more rules from an asset catalog, and retrieving, based on the one or more rules, counter information from a data set. The method further includes generating, by a processor, one or more metrics based on the one or more rules and the counter information. The method further includes evaluating, by the processor, the one or more metrics based on the one or more rules, and in an instance in which evaluation of a particular metric of the one or more metrics identifies an attribute value that exceeds a predetermined threshold, causing a notification message regarding the particular metric to be output.

The rules may be stored in the asset catalog using one or more resource description framework (RDF) graphs. Moreover, in some embodiments, the one or more rules identify attributes associated with at least one of data validity, data uniqueness, data completeness, data conformity, or data timeliness. Additionally, the method may include initiating one or more extract, transform and load (ETL) operations that normalize records in the data set based on the one or more rules. Additionally or alternatively, generating the one or more metrics comprises generating metric objects may include processing records in the data set upon initial ingestion, during an ETL operation, upon aggregation of data, or at a time when no new data is being added to the data set.

In some embodiments, the method may further include causing instantiation of one or more custom collectors designed to evaluate individual attribute values or combinations of attribute values occurring in the data set. To this end, the one or more custom collectors may be specified by the one or more rule. Alternatively, the method may include determining, by the processor, a set of custom collectors that most efficiently capture data required to evaluate the one or more rule, wherein the set of custom collectors comprise the one or more custom collectors. The counter information may include a set of counters, each of which corresponds to one of the one or more custom collectors. In this regard, a value of each counter of the set of counters represents a number of records of the data set having a predetermined individual attribute value. Additionally or alternatively, generating the one or more metrics may include causing instantiation of one or more custom reporters configured to generate the one or more metrics based on evaluations of the one or more custom collectors.

In some embodiments, evaluation of the one or more metrics includes comparing the one or more metrics to historical metrics. Moreover, the method may further include determining, by the processor, the predetermined threshold based on an analysis of historical metrics.

In another example embodiment, an apparatus is provided for evaluating data quality. The apparatus includes at least one processor and at least one memory including computer program code in which the at least one memory and the computer program code are configured to, with the at least one processor, cause the apparatus to retrieve one or more rules from an asset catalog, and retrieve, based on the one or more rules, counter information from a data set. The at least one memory and the computer program code are configured to, with the at least one processor, cause the apparatus to generate one or more metrics based on the one or more rules and the counter information, and evaluate the one or more metrics based on the one or more rules. The at least one memory and the computer program code are configured to, with the at least one processor, cause the apparatus to, in an instance in which evaluation of a particular metric of the one or more metrics identifies an attribute value that exceeds a predetermined threshold, cause a notification message regarding the particular metric to be output.

The rules may be stored in the asset catalog using one or more resource description framework (RDF) graphs. Moreover, in some embodiments, the one or more rules identify attributes associated with at least one of data validity, data uniqueness, data completeness, data conformity, or data timeliness. Additionally, the at least one memory and the computer program code may be configured to, with the at least one processor, may cause the apparatus to initiate one or more extract, transform and load (ETL) operations that normalize records in the data set based on the one or more rules. Additionally or alternatively, generating the one or more metrics comprises generating metric objects may include processing records in the data set upon initial ingestion, during an ETL operation, upon aggregation of data, or at a time when no new data is being added to the data set.

In some embodiments, the at least one memory and the computer program code are configured to, with the at least one processor, cause the apparatus to cause instantiation of one or more custom collectors designed to evaluate individual attribute values or combinations of attribute values occurring in the data set. To this end, the one or more custom collectors may be specified by the one or more rule. Alternatively, the at least one memory and the computer program code may be configured to, with the at least one processor, cause the apparatus to determine a set of custom collectors that most efficiently capture data required to evaluate the one or more rule, wherein the set of custom collectors comprise the one or more custom collectors. The counter information may include a set of counters, each of which corresponds to one of the one or more custom collectors. In this regard, a value of each counter of the set of counters represents a number of records of the data set having a predetermined individual attribute value. Additionally or alternatively, generating the one or more metrics may include causing instantiation of one or more custom reporters configured to generate the one or more metrics based on evaluations of the one or more custom collectors.

In some embodiments, evaluation of the one or more metrics includes comparing the one or more metrics to historical metrics. Moreover, the at least one memory and the computer program code may be configured to, with the at least one processor, cause the apparatus to determine the predetermined threshold based on an analysis of historical metrics.

In another example embodiment, a computer program product is provided for evaluating data quality. The computer program product includes at least one non-transitory computer-readable storage medium having computer-executable program code portions stored therein, the computer-executable program code portions comprising program code instructions that, when executed, cause an apparatus to retrieve one or more rules from an asset catalog, and retrieve, based on the one or more rules, counter information from a data set. The program code instructions, when executed, further cause the apparatus to generate one or more metrics based on the one or more rules and the counter information, and evaluate the one or more metrics based on the one or more rules. The at least one memory and the computer program code are configured to, with the at least one processor, cause the apparatus to, in an instance in which evaluation of a particular metric of the one or more metrics identifies an attribute value that exceeds a predetermined threshold, cause a notification message regarding the particular metric to be output.

The rules may be stored in the asset catalog using one or more resource description framework (RDF) graphs. Moreover, in some embodiments, the one or more rules identify attributes associated with at least one of data validity, data uniqueness, data completeness, data conformity, or data timeliness. Additionally, the program code instructions, when executed, may further cause the apparatus to initiate one or more extract, transform and load (ETL) operations that normalize records in the data set based on the one or more rules. Additionally or alternatively, generating the one or more metrics comprises generating metric objects may include processing records in the data set upon initial ingestion, during an ETL operation, upon aggregation of data, or at a time when no new data is being added to the data set.

In some embodiments, the program code instructions, when executed, may further cause the apparatus to cause instantiation of one or more custom collectors designed to evaluate individual attribute values or combinations of attribute values occurring in the data set. To this end, the one or more custom collectors may be specified by the one or more rule. Alternatively, the program code instructions, when executed, may further cause the apparatus to determine a set of custom collectors that most efficiently capture data required to evaluate the one or more rule, wherein the set of custom collectors comprise the one or more custom collectors. The counter information may include a set of counters, each of which corresponds to one of the one or more custom collectors. In this regard, a value of each counter of the set of counters represents a number of records of the data set having a predetermined individual attribute value. Additionally or alternatively, generating the one or more metrics may include causing instantiation of one or more custom reporters configured to generate the one or more metrics based on evaluations of the one or more custom collectors.

In some embodiments, evaluation of the one or more metrics includes comparing the one or more metrics to historical metrics. Moreover, the program code instructions, when executed, may cause the apparatus to determine the predetermined threshold based on an analysis of historical metrics.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
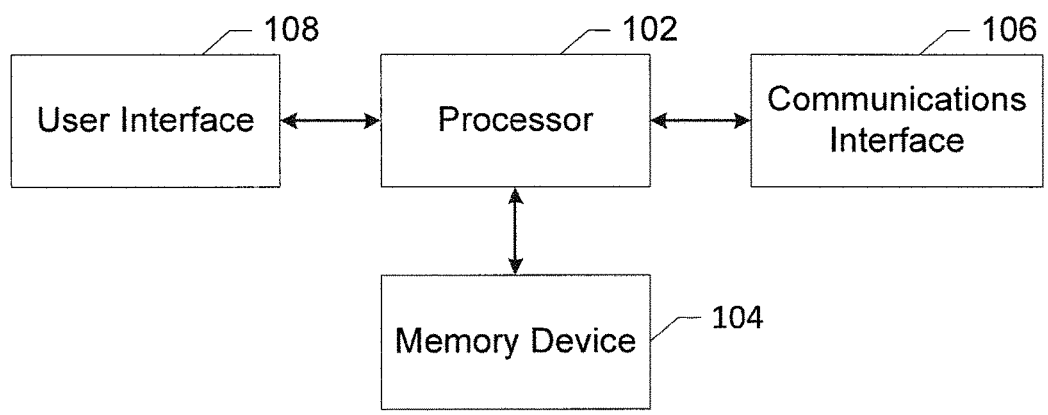
Figure 2:
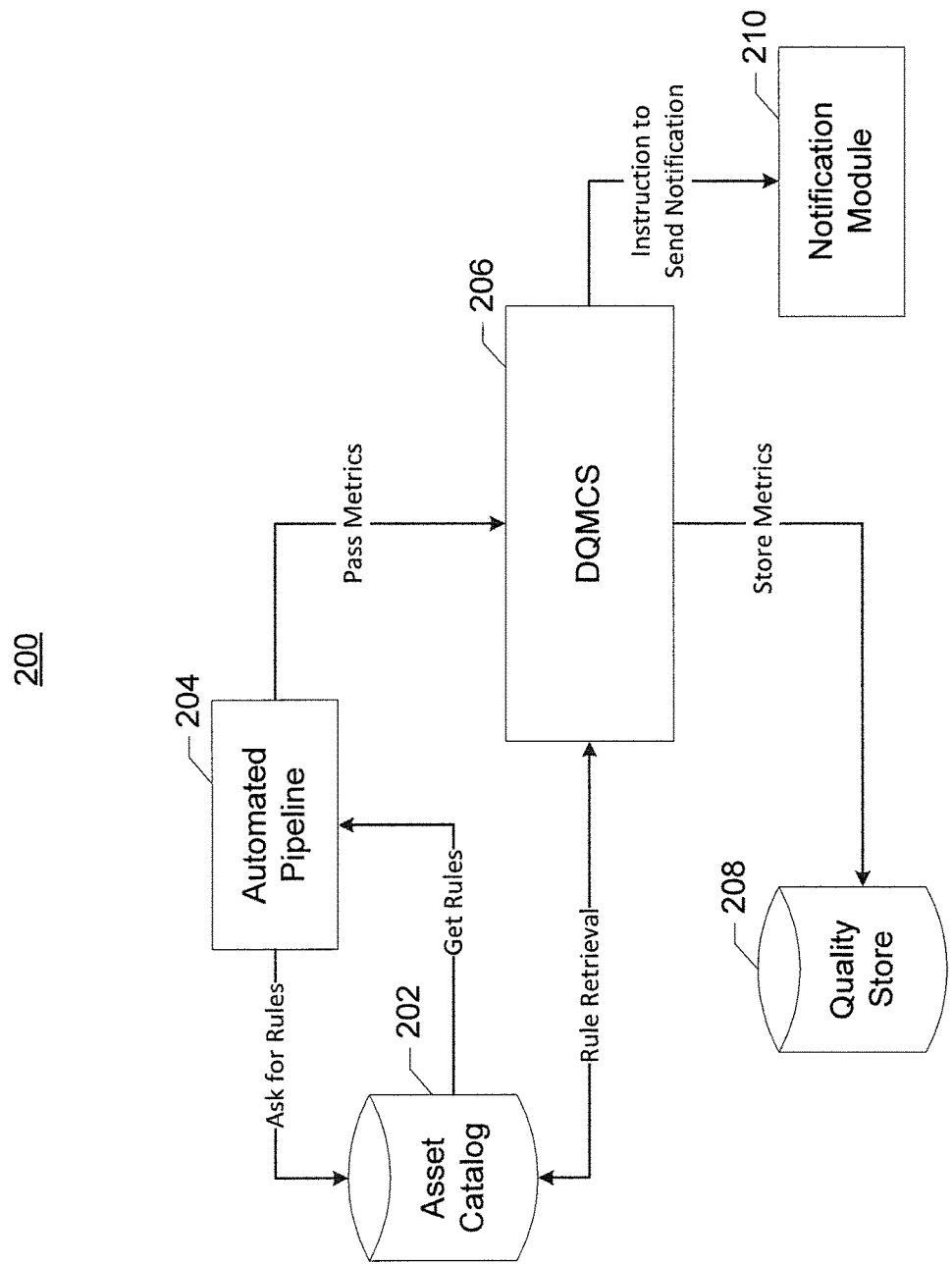
Figure 3:
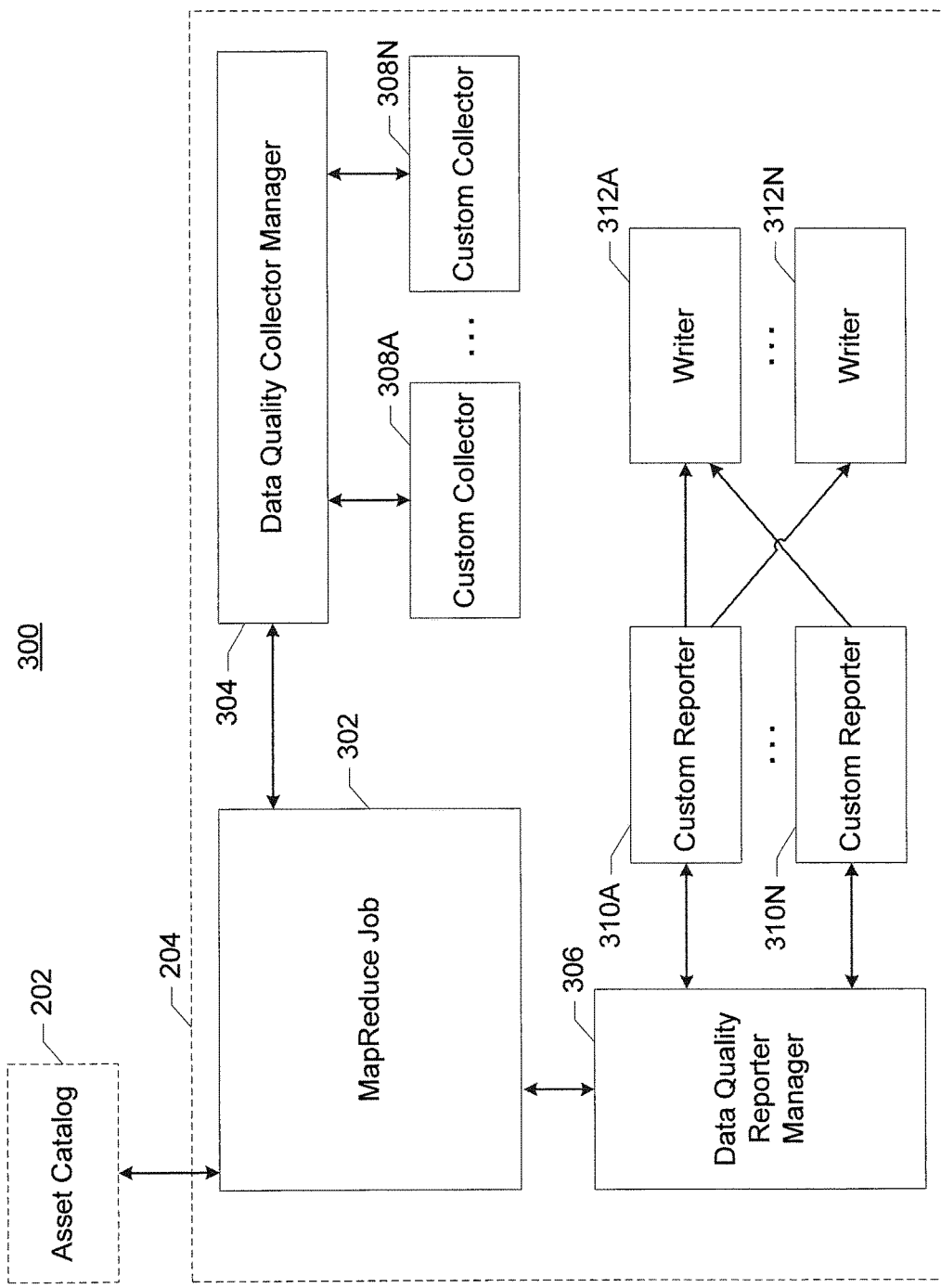
Figure 4:
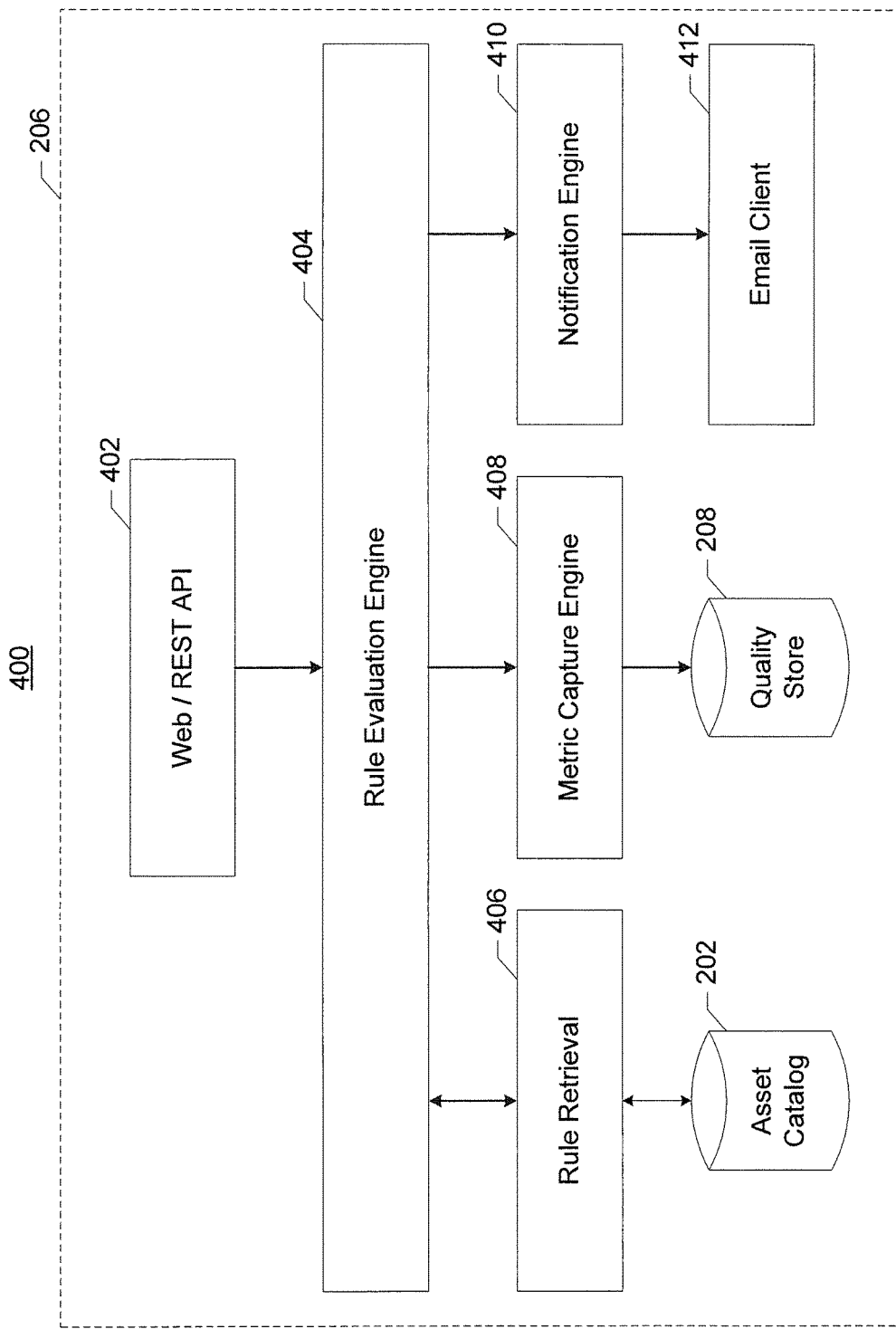
Figure 5A:
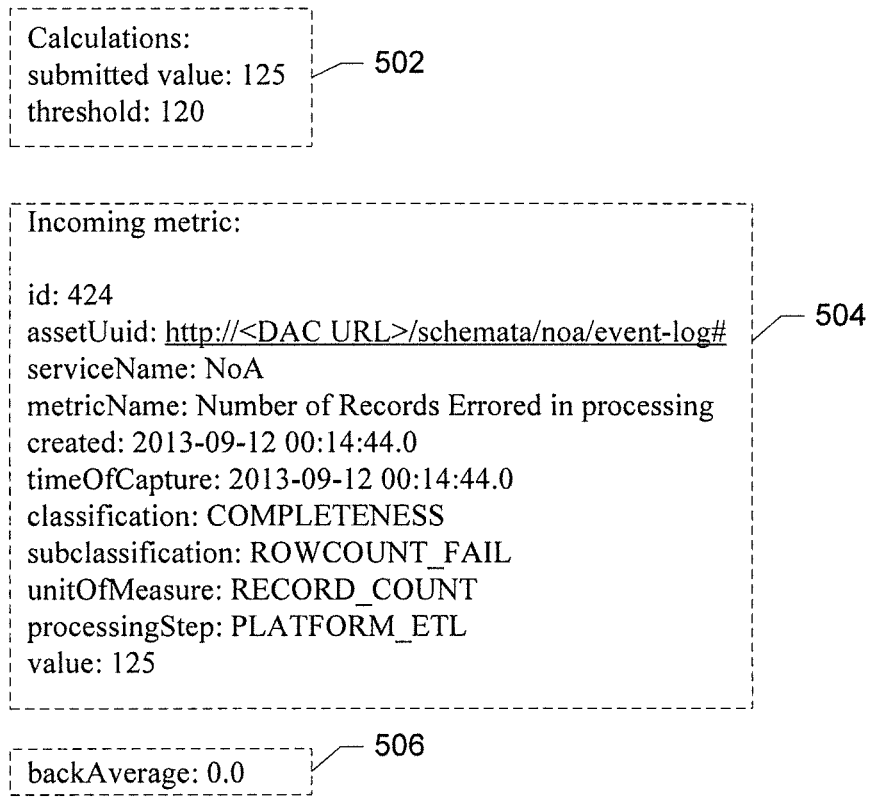
Figure 6:
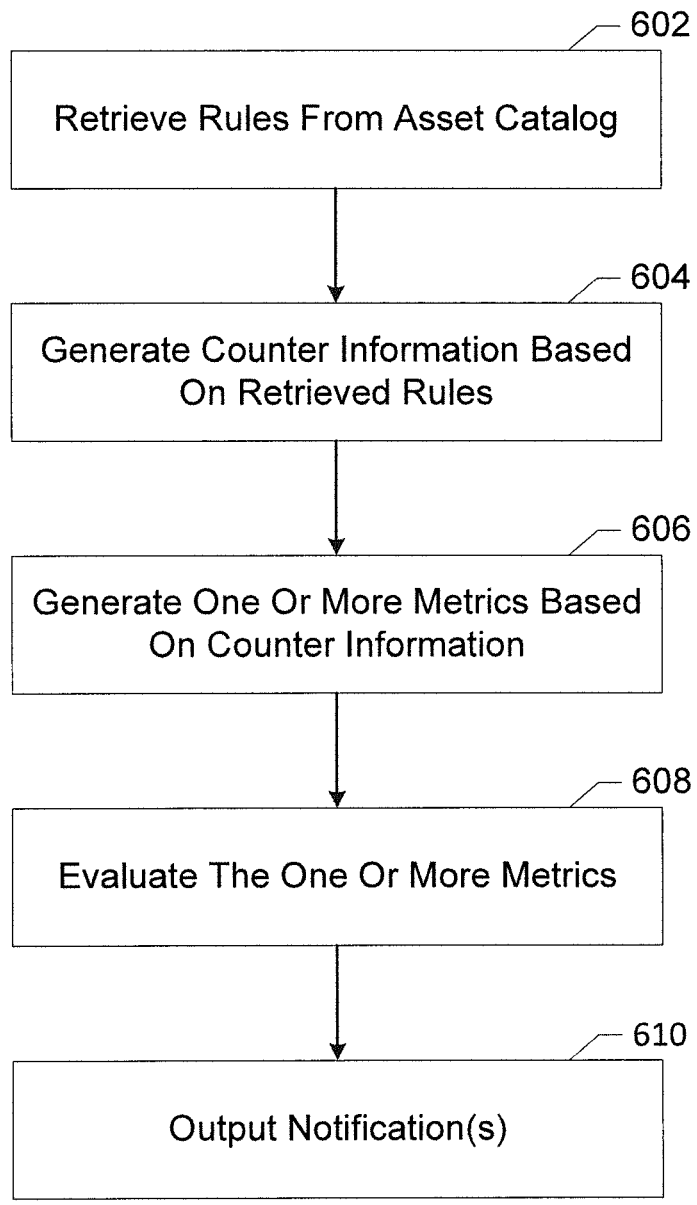

Having thus described certain example embodiments of the present disclosure in general terms, reference will now be made to the accompanying drawings, which are not necessarily drawn to scale, and wherein:

FIG. 1 shows a block diagram of an apparatus that may be specifically configured in accordance with an example embodiment of the present invention;

FIG. 2 shows a block diagram of a system that may be specifically configured to analyze the quality of data in a big data set, in accordance with an example embodiment of the present invention;

FIG. 3 shows a block diagram of an automated pipeline used to generate metric objects, in accordance with an example embodiment of the present invention;

FIG. 4 shows a block diagram of an apparatus that may be specifically configured to evaluate success or failure of generated metrics, in accordance with an example embodiment of the present invention;

FIGS. 5A and 5B illustrate example user notification messages, in accordance with some example embodiments; and FIG. 6 illustrates a flowchart describing example operations for analyzing the quality of a big data set, in accordance with some example embodiments.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

Additionally, as used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

In addition, as defined herein, an "asset" may refer generally to something of value or which contains information of value. More specifically, an asset may comprise a data set or collection of data sets having information relevant to a purpose. Accordingly, an asset catalog, discussed below, comprises a collection of metadata about an asset (e.g., available fields, descriptions of the fields, descriptions of the asset itself, business rules about how to extract, transform, and load (ETL) the data, as well as an indication of what quality metrics to collected at an attribute level (e.g., a field), or at a data set level).

A method, apparatus, and computer program product are provided in accordance with an example embodiment of the present invention to analyze the quality of large quantities of data. In this regard, the data may be stored by a distributed file system managed using a structured software framework (e.g., Apache Hadoop™, Google Big Table, Amazon Elastic Compute Cloud (EC2), Windows Azure, or the like). The method, apparatus, and computer program product may be embodied by any of a variety of devices. For example, the computing device may include a networked device, such as a server or other network entity, configured to communicate with one or more devices, such as one or more client devices. Additionally or alternatively, the devices may include fixed computing devices, such as a personal computer or a computer workstation. Still further, the method, apparatus, and computer program product of an example embodiment may be embodied by any of a variety of mobile terminals, such as a portable digital assistant (PDA), mobile telephone, smartphone, mobile television, gaming device, laptop computer, camera, tablet computer, video recorder, web camera, or any combination of the aforementioned devices.

Regardless of the type of device, an apparatus 100 is illustrated in FIG. 1 that may be specifically configured to analyze the quality of large data sets, in accordance with an example embodiment of the present invention. It should be noted that while FIG. 1 shows one example configuration, numerous other configurations may also be used to implement embodiments of the present invention. As such, in some embodiments, although elements are shown as being in communication with each other, hereinafter such elements should be considered to be capable of being embodied within the same device or within separate devices.

Referring now to FIG. 1, the apparatus 100 may include or otherwise be in communication with a processor 102, a memory device 104, a communication interface 106, and a user interface 108. In some embodiments, the processor (and/or co-processor or any other processing circuitry assisting or otherwise associated with the processor) may be in communication with the memory device via a bus for passing information among components of the apparatus. The memory device 104 may be non-transitory and may include, for example, one or more volatile and/or non-volatile memories. In other words, for example, the memory device 104 may be an electronic storage device (e.g., a computer readable storage medium) comprising gates configured to store data (e.g., bits) that may be retrievable by a machine (e.g., a computing device like the processor). The memory device 104 may be configured to store information, data, content, applications, instructions, or the like, for enabling the apparatus to carry out various functions in accordance with an example embodiment of the present invention. For example, the memory device 104 could be configured to buffer input data for processing by the processor 102. Additionally or alternatively, the memory device 104 could be configured to store instructions for execution by the processor 102.

The apparatus 100 may be embodied by a computing device, such as a computer terminal. However, in some embodiments, the apparatus may be embodied as a chip or chip set. In other words, the apparatus may comprise one or more physical packages (e.g., chips) including materials, components, and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 102 may be embodied in a number of different ways. For example, the processor 102 may be embodied as one or more of various hardware processing means such as a co-processor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor 102 may include one or more processors configured in tandem via the bus to enable independent execution of instructions, pipelining, and/or multithreading.

In an example embodiment, the processor 102 may be configured to execute instructions stored in the memory device 104 or otherwise accessible to the processor 102. Alternatively or additionally, the processor 102 may be configured to execute hard-coded functionality. As such, whether configured by hardware or software methods, or by a combination thereof, the processor 102 may represent an entity (e.g., physically embodied in circuitry) capable of performing operations according to an embodiment of the present invention while configured accordingly. Thus, for example, when the processor 102 is embodied as an ASIC, FPGA, or the like, the processor 102 may be specifically configured hardware for conducting the operations described herein. Alternatively, as another example, when the processor 102 is embodied as an executor of software instructions, the instructions may specifically configure the processor 102 to perform the algorithms and/or operations described herein when the instructions are executed. However, in some cases, the processor 102 may be a processor of a specific device (e.g., a pass-through display or a mobile terminal) configured to employ an embodiment of the present invention by further configuration of the processor by instructions for performing the algorithms and/or operations described herein. The processor 102 may include, among other things, a clock, an arithmetic logic unit (ALU), and logic gates configured to support operation of the processor.

Meanwhile, the communication interface 106 may be any means such as a device or circuitry embodied in either hardware or a combination of hardware and software that is configured to receive and/or transmit data from/to a network and/or any other device or module in communication with the apparatus 100. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

In some embodiments, the apparatus 100 may include a user interface 108 that may, in turn, be in communication with processor 102 to provide output to the user and, in some embodiments, to receive an indication of a user input. As such, the user interface 108 may include a display and, in some embodiments, may also include a keyboard, a mouse, a joystick, a touch screen, touch areas, soft keys, a microphone, a speaker, or other input/output mechanisms. Alternatively or additionally, the processor 102 may comprise user interface circuitry configured to control at least some functions of one or more user interface elements such as a display and, in some embodiments, a speaker, ringer, microphone, and/or the like. The processor 102 and/or user interface circuitry comprising the processor may be configured to control one or more functions of one or more user interface elements through computer program instructions (e.g., software and/or firmware) stored on a memory accessible to the processor 102 (e.g., memory device 104, and/or the like).

Referring now to FIG. 2, system 200 illustrates a block diagram of a system for analyzing the quality of data in a big data set, in accordance with an example embodiment of the present invention. In this regard, system 200 may be embodied by apparatus 100, and may include or otherwise be in communication with a processor 102, a memory device 104, a communication interface 106, and a user interface 108. It should be noted that while FIG. 2 shows one example configuration, numerous other configurations may also be used to implement embodiments of the present invention. As such, in some embodiments, although elements are shown as being in communication with each other, hereinafter such elements should be considered to be capable of being embodied within the same device or within separate devices.

System 200 includes an asset catalog 202, which stores a collection of metadata about an asset data set (as described above), including rules for how to perform ETL operations, analyze rows of data in the data set, and/or evaluate the quality of individual rows of data in the data set. In this regard, these rules may be designed (by an analyst) to evaluate the following classifications: (1) validity of data (e.g., by measuring the degree to which values in a given field are valid for the field); (2) uniqueness of the data (e.g., by measuring the unwanted duplication existing within the data set); (3) completeness of the data (e.g., by measuring the degree to which there is a value in each field); (4) conformity of the data (e.g., by measuring the degree to which data conforms to the specified data model or schema); and (5) timeliness of the data (e.g., by measuring the degree to which data is current and available for use as intended and in the timeframe in which they are expected). Moreover, each rule may relate to specific sub-classifications. For instance, within the validity classification, rules may relate to: unique values, range of values, type, size, length, and/or pattern. With respect to uniqueness, rules may relate to duplication. With respect to timeliness classification, rules may relate to dependencies associated with the data. With respect to conformity, rules may relate to nullables or to the schema. Finally, with respect to completeness, rules may relate to: record count, frequency distribution, content relevance, concurrency, and/or business rules.

Moreover, the rules in asset catalog 202 may be stored using a resource description framework (RDF) graph, which describe the underlying data sets and associated metadata (e.g., quality). The RDF graphs may be serialized using a number of formats. For instance, serialization may be performed using terse RDF triple language (Turtle), which is a superset of the N-Triples format, and a subset of the Notation 3 (N3) format. Additionally or alternatively, serialization may be performed using N-Triples or N3, or any other suitable format.

In this fashion, rules may be parameterized based on individual attributes within the data set, or may be broadly relevant to data set more generally. For instance, one example rule may be that a threshold for generation of a notification message is when a particular attribute of data in a data set demonstrates a predetermined percentage deviation from a normal value. In this regard, the following example rule may be generated in Turtle:

```
dqmcs:rule-percentDeviation a dac:Invocation ;
    dqmcs:alert dqmcs:alert1 ;
```

```
dac:invoke dqmcs:op-rulePercentDeviation ;
dac:parameters  ( [ dac:parameterName "percentDeviation" ;
                    dac:parameterValue .1]
                  [ dac:parameterName "numDaysBack" ;
                    dac:parameterValue .1]
                ) .
```

Subsequently, the RDF graph may be created in serialized form, which may then be translated (e.g., deserialized or inflated) into the RDF graph data structure by the system 200.

Moreover, system 202 includes an automated pipeline 204, which comprises a module that performs ETL operations to normalize row data in the data set. Moreover, automated pipeline 204 may request rules from asset catalog 202 that indicate the manner with which to evaluate rows of data in the data set and generate metrics based on the retrieved rules for subsequent delivery. The automated pipeline 204 will be described in greater detail below in connection with FIG. 3.

System 200 also includes a data quality metric capture system (DQMCS) 206 that receives metrics from the automated pipeline and, based thereon, stores metrics in quality store 208, and determines whether to send a notification (e.g., an email) to a user via email service 210. In addition, DQMCS 206 may retrieve rules from asset catalog 202 for further validation in view of the received metrics from automated pipeline 204. DQMCS 206 is described in greater detail below in connection with FIG. 4. Finally, system 200 includes a notification module 210, which is configured to send notifications to users based on the metrics generated by automated pipeline 204 and validated by DQMCS 206. In addition, system 200 is configured to store generated metrics in quality store 208, for future reference and/or comparative reporting. In this regard, the metrics stored in quality store 208 may subsequently be used by system 200 to generate graphical representations (e.g., dashboards) or detailed reports of the current status of the data set or of historical trends based on performance indicators evaluated by the rules and encapsulated by the generated metrics. In this regard, these additional reporting functions may be performed on a data set by data set basis, or may be performed at a more granular capture point by capture point basis, or by individual fields of metric objects (e.g., classification, sub-classification, or the like).

Turning now to FIG. 3, automated pipeline module 300 illustrates a block diagram describing automated pipeline 204 used to generate metric objects. In this regard, automated pipeline module 300 comprises an aspect of system 200 that may be executed by apparatus 100, which may include or otherwise be in communication with a processor 102, memory device 104, communication interface 106, and user interface 108. It should be noted that while FIG. 3 shows one example configuration of automated pipeline module 300, numerous other configurations may also be used in embodiments of the present invention. As such, in some embodiments, although elements are shown as being in communication with each other, hereinafter such elements should be considered to be capable of being embodied within the same device or within separate devices.

One function of automated pipeline 204 is to initially process the data via one or more MapReduce Jobs 302. In this regard, each MapReduce Job 302 instantiates ETL operations that normalizes the data in the data set (e.g., changing date field formats into canonical style, merging fields, etc.) based on rules retrieved from asset catalog 202.

Another function of automated pipeline 204 is to extract quality metrics via Data Quality Collector Manager 304 and Data Quality Reporter Manager 306, which are custom plugins designed to analyze and extract quality information from data in big data sets via a distributed cluster computing architecture. In this regard, rules are retrieved from asset catalog 202 that indicate what information is necessary to generate metric objects for output, as will be described below in greater detail.

In some embodiments, the metric objects are generated via batch processing of the data in a data set. In other embodiments, however, the metric objects may be generated in real-time, in which case metric objects may be output at time periods determined by the rules retrieved from asset catalog 202. For instance, a rule may be designed to send a notification to a user if a particular attribute field has a particular value a predetermined number of times. In this regard, during real-time processing of the data set, the notification will be sent immediately upon the threshold being reached, without the delay that may be introduced from batch processing.

Similarly, in some embodiments, the metric objects may be generated based on data at a variety of periods of time. For instance, metric objects may be generated based on data evaluated upon initial ingestion (as data arrives from its source). Metric objects may additionally or alternatively be captured during ETL processing. Metric objects may also be generated upon aggregation of data. Finally, metric objects may be generated when the data set is "at rest," in which case no new data is being added to the data set and a holistic evaluation of the data may be possible (to uncover larger trends in data that a more granular evaluation may overlook).

To generate a metric object, a MapReduce Job 302 may call Data Quality Collector Manager 304, which in turn initializes one or more custom collectors 308A through 308N based on the rule retrieved from asset catalog 202. In this regard, the rule may specify one or more custom collectors 308 to use to evaluate an individual attribute value or a combination of attribute values based on a rule retrieved from asset catalog 202. Alternatively, the rule may specify a desired goal, after which the automated pipeline 204 may determine autonomously a set of custom collectors 308 that most efficiently captures the data required to evaluate the rule. Either way, upon initialization, a first custom collector 308 may examine whether an address field is empty or not. For every identified row of data in the data set for which the field is empty, the custom collector 308 may increment a counter associated with the first custom collector 308. A second custom collector 308 may be initialized to count instances to evaluate another field (e.g., a date field, or the like) and may accordingly have another counter associated therewith. In situations in which a particular custom collector 308 evaluates multiple fields, there may correspondingly be multiple counters associated with the particular custom collector, to capture the results of the evaluation of each of the multiple fields.

Similarly, a MapReduce Job 302 may call Data Quality Reporter Manager 306, which may in turn initialize one or more custom reporters 310A through 310N. In this regard, there may be a different number of custom reporters 310 than custom collectors 308. Each custom reporter 310 may access any of the custom collectors 308A through 308N to create a metric object corresponding to the rule retrieved from asset catalog 202. For instance, in the above example where the custom collector 308 retrieves the number of address fields that are empty, a custom reporter 310 may query the counter associated with the custom collector 308 to generate a metric object identifying the total number of rows with an empty address field. Another custom reporter, however, may be developing a metric object based on a rule that evaluates a percentage of address fields that are empty. In this case, the reporter may query the above counter, and may additionally query another counter associated with the custom collector (which counts the number of total address fields) to generate the percentage value for the metric object.

Metric objects include a number of fields. For instance, Table 1 describes an example metric object having nine separate attribute fields. In this regard, two of these attributes may be calculated by a custom reporter 310: the value computed, and the timeOfCapture. The value computed may be based on counters associated with one or more custom collectors, as described directly above. In addition, the timeOfCapture comprises a timestamp of when the metric object is generated. The remaining attribute values may be retrieved from asset catalog 202. In other embodiments, more or fewer attributes may be included in the metric object without departing from the scope of the present invention.

TABLE 1

| Example Metric Object | |
|---|---|
| assetUuid | http://<DAC URL>/schemata/noa/event-log# |
| serviceName | NoA |
| metricName | Number of Records successfully processed |
| timeOfCapture | 2013-09-12 00:05:21.0 |
| classification | COMPLETENESS |
| subclassification | ROWCOUNT_SUCESS |
| unitOfMeaure | RECORD_COUNT |
| processingStep | PLATFORM_ETL |
| value | 63380791 |

Upon generation of a metric object, each custom reporter 310 may transmit the metric object to one or more writers 312A through 312N. In this regard, there may be a different number of writers 312 than custom collectors 308 or custom reporters 310. Each writer 312 is accordingly configured to output the data of the metric object. For instance, one example writer 312 may transmit the metric object (or may transmit text corresponding to the metric object data structure) to DQMCS 206. Other example writers 312 may transmit the metric object (or the underlying data associated with the metric object) to a user interface (e.g., user interface 108 of apparatus 100), or write the data associated with the metric object to a file (e.g., via memory device 104).

Turning now to FIG. 4, module 400 is illustrated showing the configuration of DQMCS 206 in greater detail. In this regard, module 400 is a part of system 200 and may accordingly be embodied by apparatus 100, and may include or otherwise be in communication with a processor 102, a memory device 104, a communication interface 106, and a user interface 108. It should be noted that while FIG. 2 shows one example configuration, numerous other configurations may also be used to implement embodiments of the present invention. As such, in some embodiments, although elements are shown as being in communication with each other, hereinafter such elements should be considered to be capable of being embodied within the same device or within separate devices.

DQMCS module 400 may be invoked via a web, or representative state transfer (REST) application programming interface (API) call. For instance, a writer 312 of the automated pipeline 204 may be configured to deliver the contents of a metric via a REST API call 402. DQMCS 206 may then invoke a rule evaluation engine 404. At 406, the rule evaluation engine may first retrieve the corresponding rule from asset catalog 202 to determine whether the generated metric received via REST API call 402 is expected. In this fashion, the rule evaluation engine is able to determine whether, for example, the data evaluated by automated pipeline 204 was improperly collected, whether the received metrics are valid and/or necessary, and to accordingly prevent denial of service attacks that may attempt to overload the rule evaluation engine.

Subsequently, the generated metric is transmitted to metric capture engine 408, which may perform any calculates necessary to validate the generated metric. If such calculation requires any historical comparison, metric capture engine 408 is able to communicate directly with quality store 208 to determine backAverage information relevant to any attribute field and/or calculated metric. For instance, a rule that evaluates whether the number of successful records within plus or minus 20% of the previous 14 days' average requires such backAverage information.

If a generated metric fails a particular test, such as a high or low Boolean test (e.g., if a calculated value (or percentage comparison) exceeds a high threshold or is lower than a low threshold), then notification engine 410 is triggered, which sends a notification to a user, as described below in connection with FIGS. 5A and 5B. The particular test used to evaluate the metric may be retrieved from asset catalog 202 during rule retrieval 406. Regardless of whether the generated metric passes the test or not, the generated metric is sent to quality store 208 for later retrieval and use in dashboards, detailed reports, or comparative analysis of future generated metrics.

In one embodiment, the generated metrics may be fed back to asset catalog 202, for subsequent use by analysts in revising and updating the rules stored in the asset catalog.

FIGS. 5A and 5B illustrate example notification messages that may be sent based on the data quality analysis performed by system 200. Such notification messages may be transmitted upon failure of a data set, based on business rules retrieved from asset catalog 202. In some embodiments, however, notification messages may be transmitted upon any noteworthy milestone, and may be defined by the user. In the examples shown in FIGS. 5A and 5B, the notification comprises an email message, although alternative notification mechanisms may be contemplated, such as text messaging, automated phone call, any sort of instant messaging, or the like. Moreover, the notification may be sent to a predetermined individual or group of people, or may be sent to different individuals based on the reason for the notification and the job duties of various users managing the data set.

In FIG. 5A, the notification message comprises a reason for the notification 502. In the failure message example of FIG. 5A, reason 502 includes an indication of the calculations performed and the value threshold that was exceeded. In this case, the system included a value threshold of 120 records, meaning that if more than 120 records fail this value evaluation (performed by DQMCS 206, as described above), a notification message is transmitted. Here, because 125 records failed, the notification message was generated, including this fact in the email. Moreover, the relevant metric 504 is represented in the notification message, and may include nine fields describing the various aspects of the metric, as described above. Finally, the notification message may include backAverage 506, indicating an average historical value of the relevant portion of the metric. In the example notification message shown in FIG. 5B, the reason for the notification 508 also includes results of relevant Boolean tests (e.g., whether the data set was within both a low and high threshold) that may also be performed as a precondition of a notification message. In this instance, the metric passed the low range test, but failed the high range test, thus prompting the notification message. Moreover, FIG. 5B illustrates historical average data that may be presented in the notification message, in some example embodiments. In this regard, historical average information can provide context for the user evaluating the importance of the message in the context of a predetermined period of time.

Turning now to FIG. 6, a flow chart is illustrated containing a series of operations performed to analyze the quality of data in a big data set. The operations illustrated in FIG. 6 may, for example, be performed by, with the assistance of, and/or under the control of apparatus 100, and may thus include one or more of processor 104, memory 108, user interface 102, or communications interface 106.

In operation 602, apparatus 100 includes means, such as user interface 102, processor 104, the communications interface 106, or the like, for retrieving one or more rules from an asset catalog. In this regard, the one or more rules may be retrieved and processed sequentially, or may be retrieved at once.

In operation 604, the apparatus 100 further includes means, such as processor 104 or the like, for generating, based on the one or more rules, counter information from a data set. In this regard, the counter information may comprise a total number of occurrences of a particular value in a particular type of field. Moreover, the counter information may contain the total number of occurrences of a plurality of values in respective fields. In some embodiments, generating the counter information may occur subsequent to performance of ETL operations on the data set, although it may also occur upon initial receipt of the data in the data set, after aggregation of the data in the data set, or after all unrelated data processing has concluded with respect to the data set.

Thereafter, in operation 606, the apparatus 100 may include means, such as processor 104 or the like, for generating one or more metrics based on the one or more rules and the counter information. In this regard, the one or more metrics may be based on any portion of the counter information, and may further be based on one rule or a number of rules. Moreover, the metrics may comprise metric objects (e.g., data structures containing a set of fields indicating relevant information about the data set). In some embodiments, generating the one or more metrics may comprise performing calculations to determine percentage comparison values for inclusion in the metric. In such embodiments, the generated metrics may include fields for the percentage comparison values.

In operation 608, the apparatus 100 may include means, such as processor 104 or the like, for evaluating the one or more metrics based on the rules. In this regard, the evaluation of the metrics may comprise comparing the one or more metrics to historical metrics stored in a memory device (e.g., memory device 104).

Finally, in operation 610, the apparatus 100 may include means, such as communications interface 106, user interface 108, memory 104 or the like, for outputting a notification regarding the particular metric in an instance in which the evaluation of the particular metric exceeds a predetermined threshold. In this regard, the predetermined threshold may be retrieved from the asset catalog. Alternatively, the predetermined threshold may be specified by a user, or may be automatically determined based on an analysis of historical metrics.

As described above, FIG. 6 illustrates a flowchart of the operation of an apparatus, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 108 of an apparatus employing an embodiment of the present invention and executed by a processor 104 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which preform the specified functions, or combinations of special purpose hardware and computer instructions.

In some embodiments, certain ones of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for automatically adjusting criteria for determining whether to provide a notification message regarding evaluating data quality of a data set, the method comprising:

retrieving, by a data quality analysis system comprising a processor, a memory, and at least one of a (a) communications interface configured to communicate via at least one network or (b) a user interface, one or more rules from an asset catalog stored by the memory, wherein the one or more rules comprise at least one of (a) a rule for how to perform an extract, transform, and load (ETL) operation, (b) a rule for how to analyze rows of data in a data set, or (c) a rule for how to evaluate a quality of individual rows of data in the data set, and wherein the asset catalog comprises a collection of metadata about one or more data sets;

initiallizing, by the data quality analysis system, one or more custom collectors, each custom collector being programmed to evaluate a predefined one or more variable attributes occurring within a data set of the one or more data sets, the one or more custom collectors selected based on the one or more rules;

processing, by the data quality analysis system, the data set of the one or more data sets using the one or more custom collectors to generate counter information, wherein the counter information indicates the number of records within the data set having at least one particular value within at least one particular field corresponding to the predefined one or more variable attributes;

generating, by the data quality analysis system, one or more metrics based on the one or more rules and the counter information, wherein generating the one or more metrics comprises generating one or more metric objects, the metric objects being data structures comprising a plurality of fields indicating information relevant to the data set, wherein (a) each metric object of the one or more metric objects corresponds to a rule of the one or more rules and (b) a metric object of the one or more metric objects comprises one or more fields determined based on the corresponding rule of the one or more rules;

automatically adjusting, by the data quality analysis system, a predetermined threshold based on one or more historical metrics, the one or more historical metrics accessed from the memory, wherein the historical metrics (a) were generated based on evaluating one or more previous data sets of the asset catalog using one or more rules of the asset catalog and (b) are stored in the memory;

evaluating, by the data quality analysis system, the one or more metrics based on the one or more rules and the adjusted predetermined threshold;

and responsive to a particular metric of the one or more metrics identifying an attribute value that exceeds the adjusted predetermined threshold, causing a notification message regarding the particular metric to be output via at least one of (a) the communications interface or (b) the user interface, such that a decision regarding storing the data set in the asset catalog is made based on the notification message.

2. The method of claim 1, wherein the rules are stored in the asset catalog using one or more resource description framework (RDF) graphs.

3. The method of claim 1, wherein the one or more rules identify attributes associated with at least one of data validity, data uniqueness, data completeness, data conformity, or data timeliness.

4. The method of claim 1, further comprising initiating one or more extract, transform and load (ETL) operations that normalize records in the data set based on the one or more rules.

5. The method of claim 1, wherein generating the one or more metrics comprises generating the metric objects by processing records in the data set upon initial ingestion, during an ETL operation, upon aggregation of data, or at a time when no new data is being added to the data set.

6. The method of claim 1, further comprising:
causing instantiation of one or more custom collectors designed to evaluate individual attribute values or combinations of attribute values occurring in the data set.

7. The method of claim 6, wherein the one or more custom collectors are specified by the one or more rule.

8. The method of claim 6, further comprising:
determining, by the processor, a set of custom collectors that most efficiently capture data required to evaluate the one or more rule,
wherein the set of custom collectors comprise the one or more custom collectors.

9. The method of claim 6, wherein the counter information comprises a set of counters, each of which corresponds to one of the one or more custom collectors.

10. The method of claim 9, wherein a value of each counter of the set of counters represents a number of records of the data set having a predetermined individual attribute value.

11. The method of claim 6, wherein generating the one or more metrics comprises:
causing instantiation of one or more custom reporters configured to generate the one or more metrics based on evaluations of the one or more custom collectors.

12. The method of claim 1, wherein evaluation of the one or more metrics comprises comparing the one or more metrics to historical metrics.

13. The method of claim 1, further comprising determining, by the processor, the predetermined threshold based on an analysis of historical metrics.

14. An apparatus for automatically adjusting criteria for determining whether to provide a notification message regarding evaluating data quality of a data set, the apparatus comprising at least one processor, at least one memory including computer program code, and at least one of (a) a communications interface configured to communicate via at least one network or (b) a user interface, the at least one memory and the computer program code configured to, with the at least one processor, cause the apparatus to:
retrieve one or more rules from an asset catalog stored by the at least one memory, wherein the one or more rules comprise at least one of (a) a rule for how to perform an extract, transform, and load (ETL) operation, (b) a rule for how to analyze rows of data in a data set, or (c) a rule for how to evaluate a quality of individual rows of data in the data set, and wherein the asset catalog comprises a collection of metadata about one or more data sets;
initialize one or more custom collectors, each custom collector being programmed to evaluate a predefined one or more variable attributes occurring within a data set of the one or more data sets, the one or more custom collectors selected based on the one or more rules;
process the data set of the one or more data sets using the one or more custom collectors to generate counter information, wherein the counter information indicates the number of records within the data set having at least one particular value within at least one particular field corresponding to the predefined one or more variable attributes;
generate one or more metrics based on the one or more rules and the counter information, wherein generating the one or more metrics comprises generating one or more metric objects, the metric objects being data structures comprising a plurality of fields indicating information relevant to the data set, wherein (a) each metric object of the one or more metric objects corresponds to a rule of the one or more rules and (b) a metric object of the one or more metric objects comprises one or more fields determined based on the corresponding rule of the one or more rules;
automatically adjust a predetermined threshold based on one or more historical metrics, the one or more historical metrics accessed from the at least one memory, wherein the historical metrics (a) were generated based on evaluating one or more previous data sets of the asset catalog using one or more rules of the asset catalog and (b) are stored in the at least one memory;
evaluate the one or more metrics based on the one or more rules and the adjusted predetermined threshold;
and
responsive to a particular metric of the one or more metrics identifying an attribute value that exceeds the adjusted predetermined threshold, cause a notification message regarding the particular metric to be output via at least one of (a) the communications interface or (b) the user interface, such that a decision regarding storing the data set in the asset catalog is made based on the notification message.

15. The apparatus of claim 14, wherein the one or more rules identify attributes associated with at least one of data validity, data uniqueness, data completeness, data conformity, or data timeliness.

16. The apparatus of claim 14, wherein the at least one memory and the computer program code are configured to, with the at least one processor, cause the apparatus to generate the one or more metrics by processing records in the data set upon initial ingestion, during an ETL operation, upon aggregation of data, or at a time when no new data is being added to the data set.

17. The apparatus of claim 14, wherein the at least one memory and the computer program code are further configured to, with the at least one processor, cause the apparatus to:
cause instantiation of one or more custom collectors designed to evaluate individual attribute values or combinations of attribute values occurring in the data set.

18. The apparatus of claim 17,
wherein the counter information comprises a set of counters, each of which corresponds to one of the one or more custom collectors, and
wherein a value of each counter of the set of counters represents a number of records of the data set having a predetermined individual attribute value.

19. The apparatus of claim 17, wherein the at least one memory and the computer program code are configured to, with the at least one processor, cause the apparatus to generate the one or more metrics by:

causing instantiation of one or more custom reporters configured to generate the one or more metrics based on evaluations of the one or more custom collectors.

20. A computer program product for automatically adjusting criteria for determining whether to provide a notification message regarding evaluating data quality of a data set, the computer program product comprising at least one non-transitory computer-readable storage medium having computer-executable program code portions stored therein, the computer-executable program code portions comprising program code instructions that, when executed, cause an apparatus comprising a processor, a memory, and at least one of (a) a communications interface configured to communicate via at least one network or (b) a user interface to:

retrieve, by the processor, one or more rules from an asset catalog stored by the memory, wherein the one or more rules comprise at least one of (a) a rule for how to perform an extract, transform, and load (ETL) operation, (b) a rule for how to analyze rows of data in a data set, or (c) a rule for how to evaluate a quality of individual rows of data in the data set, and wherein the asset catalog comprises a collection of metadata about one or more data sets;

initialize, by the processor, one or more custom collectors, each custom collector being programmed to evaluate a predefined one or more variable attributes occurring within a data set of the one or more data sets, the one or more custom collectors selected based on the one or more rules;

process, by the processor, the data set of the one or more data sets using the one or more custom collectors to generate counter information, wherein the counter information indicates the number of records within the data set having at least one particular value within at least one particular field corresponding to the predefined one or more variable attributes;

generate, by the processor, one or more metrics based on the one or more rules and the counter information, wherein generating the one or more metrics comprises generating one or more metric objects, the metric objects being data structures comprising a plurality of fields indicating information corresponding to the data set, wherein (a) each metric object of the one or more metric objects corresponds to a rule of the one or more rules and (b) a metric object of the one or more metric objects comprises one or more fields determined based on the corresponding rule of the one or more rules;

automatically adjust a predetermined threshold based on one or more historical metrics, the one or more historical metrics accessed from the memory, wherein the historical metrics (a) were generated based on evaluating one or more previous data sets of the asset catalog using one or more rules of the asset catalog and (b) are stored in the memory;

evaluate, by the processor, the one or more metrics based on the one or more rules and the adjusted predetermined threshold;

and responsive to a particular metric of the one or more metrics identifying an attribute value that exceeds the adjusted predetermined threshold, cause, by the processor, a notification message regarding the particular metric to be output via at least one of (a) the communications interface or (b) the user interface, such that a decision regarding storing the data set in the asset catalog is made based on the notification message.

\* \* \* \* \*